United States Patent
Sobchak et al.

(10) Patent No.: US 7,385,913 B2
(45) Date of Patent: Jun. 10, 2008

(54) METHOD AND APPARATUS FOR COMPENSATING FOR VARIATIONS IN A RECEIVE PORTION OF A WIRELESS COMMUNICATION DEVICE

(75) Inventors: Charles Leroy Sobchak, Davie, FL (US); Mahibur Rahman, Lake Worth, FL (US); Clinton C Powell, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 1009 days.

(21) Appl. No.: 10/131,660

(22) Filed: Apr. 24, 2002

(65) Prior Publication Data

US 2004/0013083 A1 Jan. 22, 2004

(51) Int. Cl.
*H04J 11/00* (2006.01)
*H04B 7/216* (2006.01)
(52) U.S. Cl. .............. 370/203; 370/335; 370/342
(58) Field of Classification Search .......... 370/203, 370/252, 335, 342; 375/233
See application file for complete search history.

(56) References Cited

U.S. PATENT DOCUMENTS

| | | | | |
|---|---|---|---|---|
| 5,787,118 A | * | 7/1998 | Ueda | 375/232 |
| 5,999,563 A | * | 12/1999 | Polley et al. | 375/222 |
| 6,356,586 B1 | * | 3/2002 | Krishnamoorthy et al. | 375/233 |
| 6,668,014 B1 | * | 12/2003 | Endres et al. | 375/232 |
| 6,839,379 B1 | * | 1/2005 | Horng et al. | 375/148 |
| 2002/0054634 A1 | * | 5/2002 | Martin et al. | 375/232 |
| 2002/0131488 A1 | * | 9/2002 | Allpress et al. | 375/233 |
| 2002/0150155 A1 | * | 10/2002 | Florentin et al. | 375/233 |
| 2003/0138040 A1 | * | 7/2003 | Rouphael et al. | 375/233 |
| 2003/0235245 A1 | * | 12/2003 | Erdogan et al. | 375/232 |
| 2004/0008765 A1 | * | 1/2004 | Chung et al. | 375/233 |

* cited by examiner

*Primary Examiner*—Edan Orgad
*Assistant Examiner*—Blanche Wong
(74) *Attorney, Agent, or Firm*—Charles W. Bethards

(57) ABSTRACT

A generator (304) generates first and second training signals (320, 318) that originate within a wireless communication device (FIG. 3) instead of being received from a source outside the device. A receive portion (212, 214, 216) of the device processes the first training signal to derive a processed training signal. An adaptive equalizer (310) equalizes the processed training signal to derive an equalized training signal. A processor (312) compares the equalized training signal and the second training signal using an adaptive algorithm to derive coefficients for the adaptive equalizer to compensate for variations in the receive portion, and adjusts the adaptive equalizer in accordance with the coefficients to derive a compensated output signal.

19 Claims, 7 Drawing Sheets

METHOD AND APPARATUS FOR COMPENSATING FOR VARIATIONS IN A RECEIVE PORTION OF A WIRELESS COMMUNICATION DEVICE

FIELD OF THE INVENTION

This invention relates in general to wireless communication systems, and more specifically to a method and apparatus for compensating for variations in a receive portion of a wireless communication device.

BACKGROUND OF THE INVENTION

Optimal demodulation of signals in additive white Gaussian noise channels requires that the receive filter be matched to the transmit filter. A wireless communication device, however, generally uses analog filters in its receive portion for anti-aliasing and selectivity purposes. Unfortunately, the frequency and time domain responses of analog filters can vary over process, temperature, and supply voltage. Thus, in the prior art it has not been possible to maintain a fixed composite response in the receiver that is matched to the transmit filter in the base station throughout the operational life and environmental range of the wireless device without using a training sequence originating from the base transmitter. Such non-optimal, unmatched filtering can degrade the receiver sensitivity by more than 1 dB. Further, for high data rate systems such as those commonly referred to as 2.5G and 3G systems, a 1 dB sensitivity loss can lead to significant loss in system throughput and capacity.

Thus, what is needed is a method and apparatus for compensating for variations in the receive portion of a wireless communication device. Preferably, the method and apparatus will provide near-optimal matched filtering and, hence, greatly improved receiver performance over the operating life of the wireless communication device.

DETAILED DESCRIPTION

Figure 1:
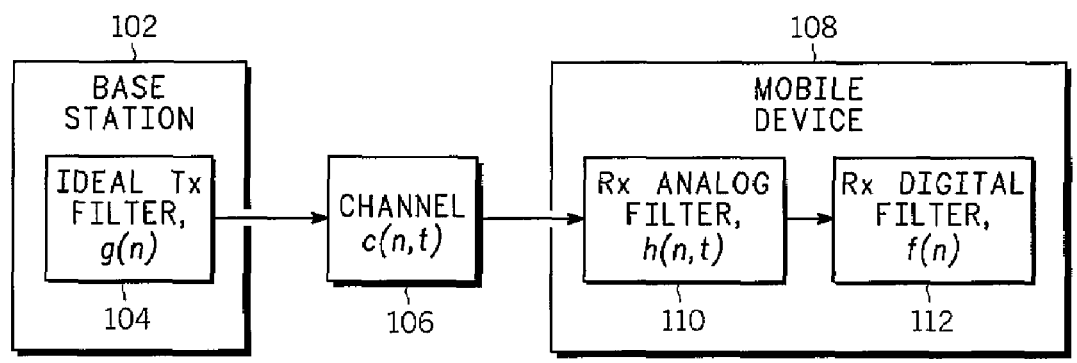
FIG. 1 is an electrical block diagram depicting channel filters in a prior-art wireless communication system.

Referring to FIG. 1, an electrical block diagram depicts channel filters in a prior-art wireless communication system. The filters include an ideal transmit filter 104 in a base station 102. The transmit filter 104 comprises relatively expensive components to achieve a filter response, g(n), that is close to ideal and is maintained to a high degree over, for example, temperature and supply voltage variations. Next, there is a response, c(n,t) of the communications channel 106, which varies over time.

Finally, in a mobile device 108, a receiver's composite channel filter response is primarily dictated by an analog baseband filter 110 prior to the A/D, and a digital baseband selectivity filter 112 located thereafter. This is because other filters within the receiver such as high frequency SAW type filters used for the RF/IF frequencies typically exhibit a rather flat in-band group delay response and a much wider cutoff frequency than the baseband filters. This results in the RF/IF filters having a negligible impact on the in-band magnitude/phase response of the composite channel filter in the receiver of the mobile device. For this reason, the effects of the RF/IF filters are largely ignored in this disclosure. In FIG. 1, the analog filter response, h(n,t), primarily denotes the response of the analog baseband filter 110, which serves the purposes of anti-aliasing as well as protection against nearby blockers and higher order modulation products. Notice that the response of this analog filter has a time variable, t, associated with it, since its response varies with asundry process, temperature, and supply voltage variations. Ultimately, after the A/D device, there is typically the need for the digital baseband selectivity filter 112 with response, f(n), to provide the final mobile device selectivity against adjacent channel and blocker type interferers. Another purpose of this digital filter is to provide a composite magnitude/phase response in the receiver which matches that in the base station transmitter in an attempt to maximize SNR (Signal-to-Noise ratio) and thus receiver sensitivity. Note that the digital filter response, f(n), does not have any time variable associated with it since its magnitude/phase response does not significantly change over or with process, temperature, and supply voltage variations.

There are many methods in designing, f(n), with varying complexity and sensitivity, which are inversely proportional. The most common method for designing f(n), which is the least complex and hence provides the worst average SNR, uses a single fixed filter designed for the mean value of the analog circuit, h(n,t). However, any deviation in the channel, c(n,t), or the analog circuit, h(n,t), will result in a degradation of the SNR. Hence, the most complex method for f(n), which provides the best SNR, is an adaptive filter to model both the channel, c(n,t), and receiver front end analog circuits, h(n,t). This method requires that the base station transmitter periodically send training sequences. This will result in the optimal receiver SNR, assuming that c(n,t) and h(n,t) change very slowly during the period of time between training sequences. The main drawback is that the system's throughput is decreased because the base transmitter must periodically transmit such training sequences.

An aspect of the present invention described herein below is that it can improve the receiver sensitivity when employing communication standards which do not have provisions for periodic training sequences in the protocol definition. For protocols that do support periodic training sequences, the present invention is still applicable in situations when the training sequence is NOT received with sufficient signal strength.

Figure 2:
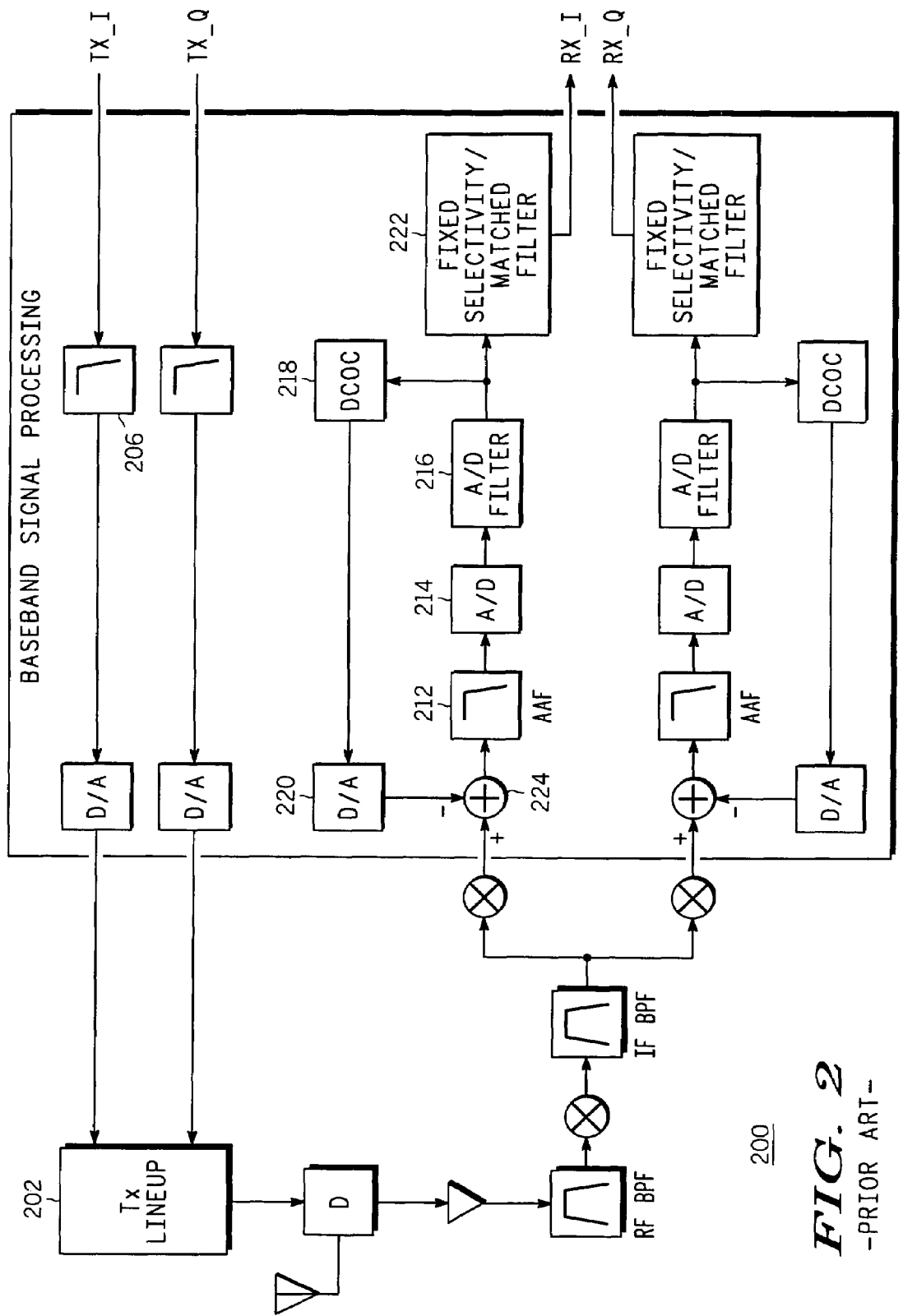
FIG. 2 is an electrical block diagram of an exemplary prior-art wireless communication device.

Referring to FIG. 2, an electrical block diagram depicts an exemplary prior-art wireless communication device 200 with quadrature inputs to the transmit signal path and quadrature outputs from the receive signal path. The transmit path consists of ideal I/Q digital transmit filters 206 at baseband whose outputs are converted to the analog domain by digital to analog convertors before being modulated up to RF frequency levels in the transmit lineup 202. In the receive path, the RF signal is first demodulated to a baseband signal and then passed through an analog anti-aliasing/blocker protection filter (AAF) 212 before being converted to digital I/Q signals using the A/D converters 214. Following the A/D converters, digital A/D filters 216 as shown are required when commonly used oversampled A/D type converters are employed. (Other types of A/D converters may not require the A/D filters 216) Such oversampled A/D converters are frequently used to minimize the selectivity (and also cost) requirements of the anti-aliasing filter. Popular sigma-delta type A/D converters also fall into this oversampled A/D converter category. The A/D filters 216 shown in this diagram are essentially decimation filters which preserve the in-band frequency response and sufficiently attenuate out-of-band noise. With this baseband line-up, the response of the receiver portion comprising the AAF 212 and the A/D converter 214 can vary over process, temperature, and supply voltage.

In addition, encompassing the analog baseband filter and the A/D unit there typically is the need for a mixed-mode DC offset correction (DCOC) loop 218, 220. The purpose of this loop is to eliminate static and dynamic DC offsets that can leak to the baseband signal path and can adversely affect the dynamic range of both the analog baseband filter 212 and the A/D 214. In addition, DC offsets can also degrade the detectability of the received signal. The DCOC loop is typically comprised of digital DC offset detection 218, conversion of the DC offset error signal to analog format in a D/A 220, and subtraction of the error from the input signal at the baseband filter input 224. After this DC correction loop, there resides a fixed digital filter 222 which provides additional selectivity against adjacent channel and blocker type interferers. Another purpose of this filter 222 is to provide a matched filter response to achieve improved SNR. Unfortunately, since this digital filter is typically a fixed filter, greater than 1 dB sensitivity loss can result due to variations in the analog baseband filter pole/zero locations with or over process, temperature, and supply voltage variations. This is because these changes in the pole and zero locations result in undesirable distortions in the cutoff frequency, high frequency amplitude peaking, and group delay responses. The result of all this is degraded SNR at the detection unit and reduced receiver sensitivity performance.

Figure 3:
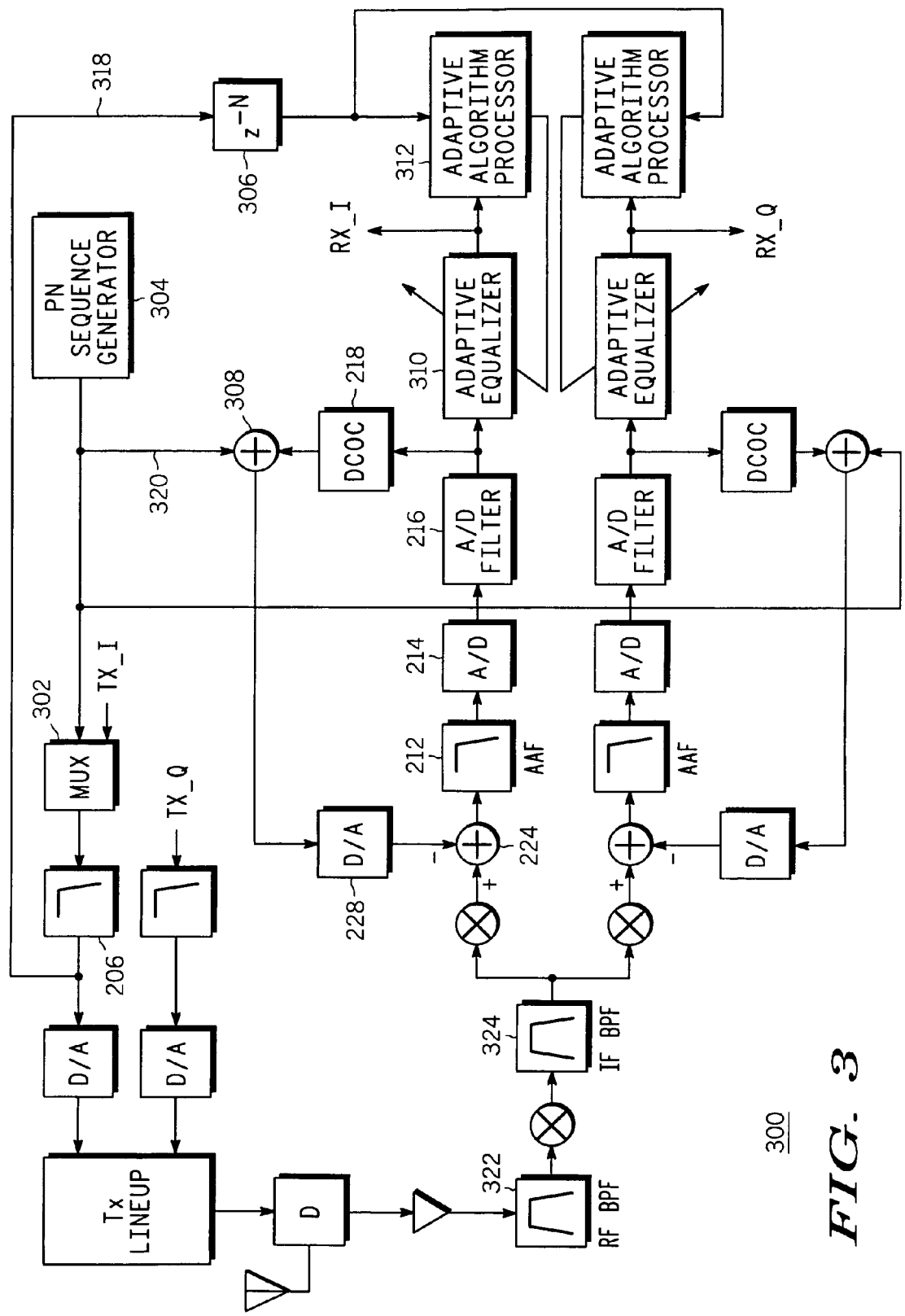
FIG. 3 is an electrical block diagram of an exemplary wireless communication device in accordance with a first embodiment of the present invention.

Referring to FIG. 3, an electrical block diagram 300 depicts an exemplary wireless communication device in accordance with a first embodiment of the present invention. The diagram 300 is similar to the diagram 200, the essential difference being the replacement of the fixed selectivity filter 222 by the adaptive equalizer 310 and control circuitry therefor, in accordance with the present invention, as described further herein below. As mentioned earlier, the RF/IF high frequency SAW type filters 322, 324 are typically much wider bandwidths with a rather flat group delay response in-band, thus, they have a negligible impact on the in-band response. Therefore, we do not compensate for these high frequency filters in the adaptive equalizer 310. This equalizer can adaptively compensate for the frequency and time domain distortions in both the analog baseband filter (AAF) 212 and the A/D converter 214. The adaptive architecture depicted in FIG. 3 advantageously makes use of pre-existing hardware with minimal additional circuitry to achieve the desired adaptation while achieving the desired channel selectivity at the same time. The adaptive equalizer works as follows. During periodic warm-up sequences, after the DC offset correction loop has settled, a conventional pseudo-random PN sequence generator 304 preferably is used to supply a first training signal 320 to an input 308 of the feedback path in the DC offset correction loop in both the I and Q portions of the receive path. It is also preferably applied (through a multiplexer 302) to the input of the ideal transmit filter 206 of the I transmit path to derive a second training signal 318. As shown, the first training signal 320 preferably is added to the DC offset acquired previously and then the result is fed into the input of the analog baseband filter 212. This ensures that the training signal does not have any undesirable DC offset bias. The first training signal is then processed by the analog baseband filter 212 and the A/D section 214, 216 to derive a processed training signal at the input of the adaptive equalizer 310. The signal path through the analog baseband filters and the A/Ds represents the non-ideal signal path while the signal path through the transmit filter to the inputs of the equalizers represents the ideal signal path. It will be appreciated that, alternatively, other types of training signals, e.g., a step input, a ramp input, an impulse, can be used as well for training the adaptive equalizer 310. It will be further appreciated that, alternatively, the training signal can be inserted into a different point of the analog section of the receive path, e.g., directly into the analog baseband filter 212. In addition, it will be appreciated that, alternatively, another filter, e.g., a desired target receive filter that achieves an optimal link performance in the presence of expected interferers, can be used instead of the ideal transmit filter 206 for deriving the second training signal 318.

The adaptive equalizer 310 equalizes the processed training signal to derive an equalized training signal at its output. The adaptive equalizer 310 and adaptive algorithm processor 312 then cooperate to compare the equalized training signal with the second training signal 318 to modify the equalizer coefficients with the objective of matching the equalized training signal to the second training signal. Note that the delay element, $z^{-N}$ 306, which is used in the ideal signal path is used to compensate for any additional delays in the non-ideal signal path through the baseband filter 212 and A/D section 214, 216. After the adaptive equalization has been completed, the adaptive equalizer coefficients are held until the next warm-up sequence when the first and second training signals are again applied for adaptation purposes. It will be appreciated that the digital portions of the diagram 300 can be realized in a conventional digital signal processor (DSP) through software written by one of ordinary skill in the art, given the teachings of this disclosure. It will be further appreciated that some or all portions of the diagram 300 can be realized in one or more custom integrated circuits.

Figure 4:
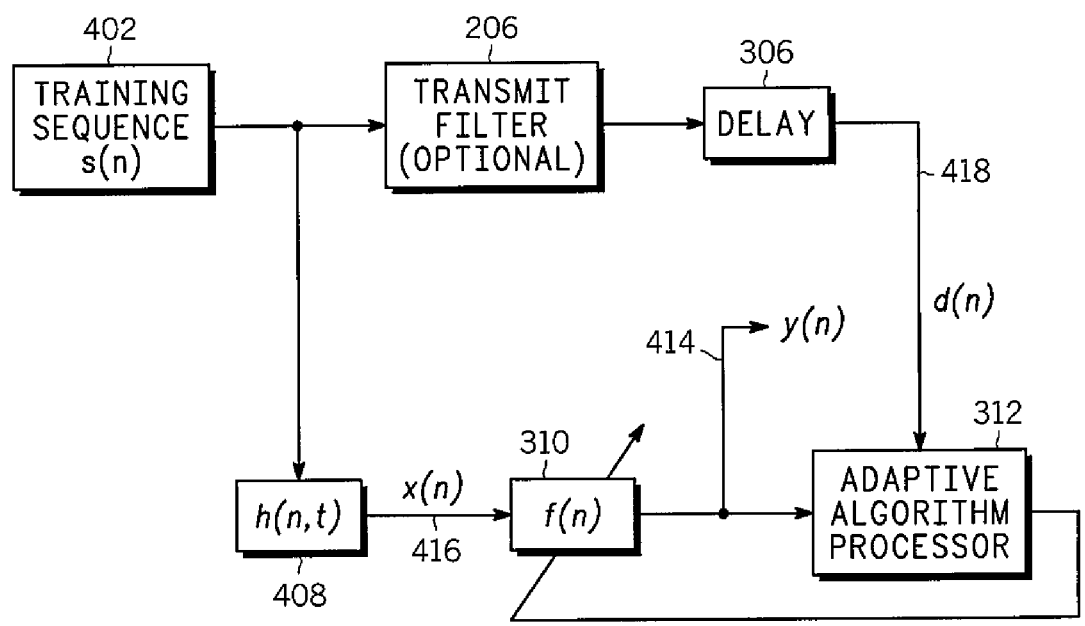
FIG. 4 is a simplified operational block diagram in accordance with the present invention.

Referring to FIG. 4, a simplified block diagram in accordance with the present invention helps explain the operation of the diagram 300. Here, the filter, h(n,t) 408 represents the composit response of the analog baseband filter 212 and the A/D section 214, 216, which can vary over or with process, temperature, and supply voltage variations. Thus, it represents the non-ideal signal path. The output of filter 408 is x(n) 416 and this is applied to the adaptive equalizer 310 having respnse f(n) to provide the output y(n) 414 which is also coupled to the adaptive algorithm processor 312. The ideal signal path is represented by the path through the transmit filter 206 and delay element 306 that provides the ideal or reference signal d(n) 418 to the adaptive algorithm processor 312. The objective of the adaptive algorithm processor 312 is to modify the response $f(n)$, of the adaptive equalizer 310 such that the response of the non-ideal path is corrected to match that of the ideal path.

The equalizer training process preferably uses known optimal filtering methods to determine the coefficients for the matched filter. The adaptive algorithm can be any one of the following known adaptation methods:

Least Mean Squares (LMS) (This is the preferred method when a PN training sequence is used):

$$\underline{f_{n+1}} = \underline{f_n} + \alpha e(n)\underline{x_n}$$

where e(n)=d(n)−y(n).

Recursive Least Squares (RLS) (Alternative method):

$$\underline{f_{n+1}} = \underline{f_n} + \alpha R^{-1} e(n)\underline{x_n}$$

where:

$$R = E\{\underline{x_n}\underline{x_n^T}\}.$$

It will be further appreciated that, as a further alternative, a more complex method such as the decision feed back equalizer, DFE, which will completely remove all intersymbol interference, can be utilized as well to establish the equalizer coefficients.

Figure 5:
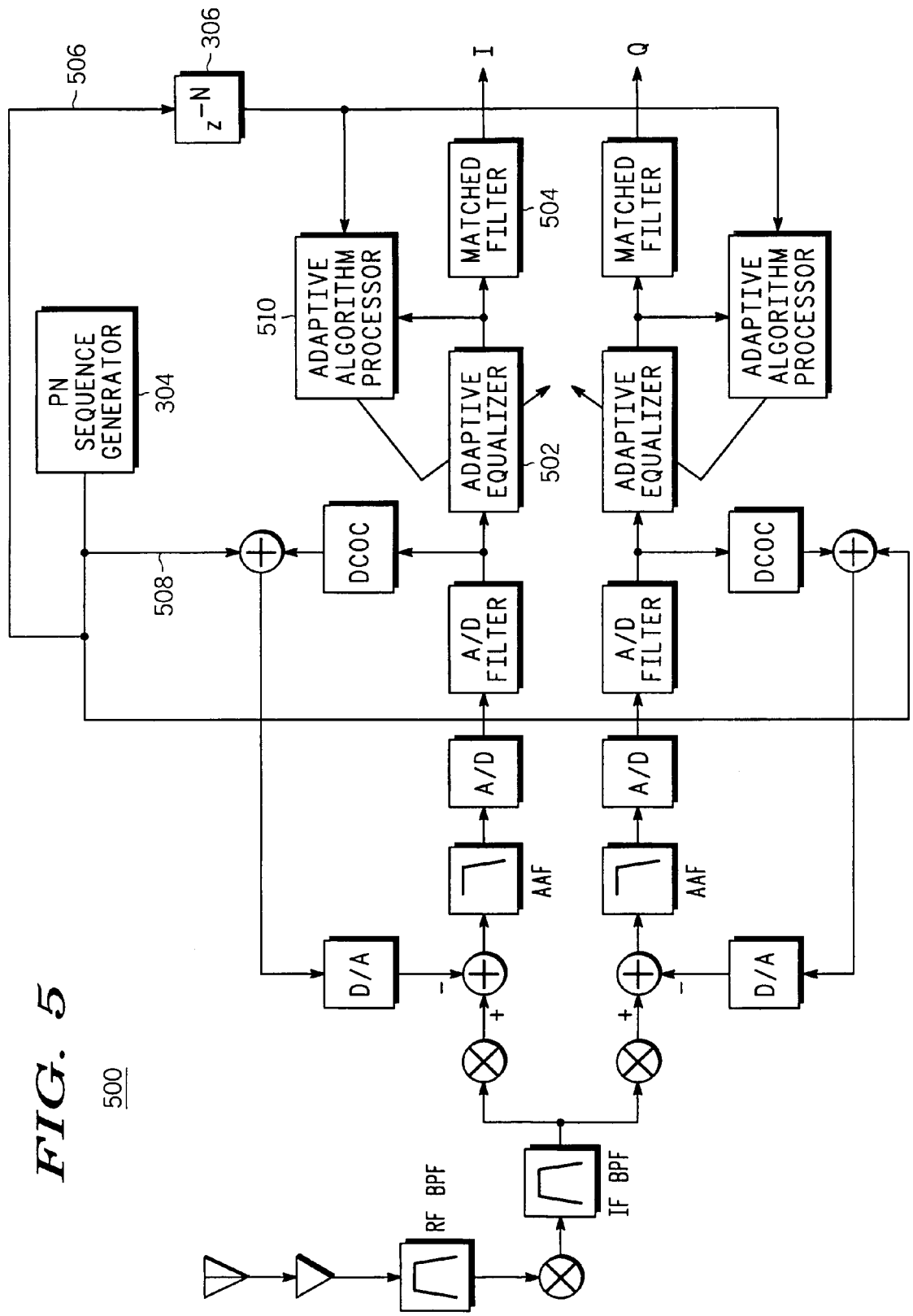
FIG. 5 is an electrical block diagram of an exemplary wireless communication device in accordance with a second embodiment of the present invention.

FIG. 3 showed how a transceiver can use its own transmit filter to create the ideal path for the adaptive algorithm, but this is not necessary. A second embodiment for achieving the same equalization goals is illustrated in FIG. 5. Here, the transmit filter 206 is not included in the ideal path. In this case, the adaptive algorithm processor 510 will cooperate with the adaptive equalizer 502 to create an equalizer response which is the inverse response of the analog baseband functions. Their goal is to create an inverse response filter given the ideal unfiltered PN sequence and the non-ideally filtered PN sequence (by the analog baseband functions) as inputs.

The FIG. 5 electrical block diagram 500 of an exemplary wireless communication device in accordance with a second embodiment of the present invention is similar to the diagram 300, the essential difference being that the ideal transmitter filter 206 is not used to derive the second training signal. Instead, the first and second training signals 508, 506 are identical to one another. Also, following the adaptive equalizer 502 resides an ideal matched filter 504. Its purpose is to provide a matched filter response to the base station transmit filter 104 while at the same time meeting the out-of-band selectivity requirements. The architecture depicted in FIG. 5 advantageously is more cost effective than the architecture depicted in FIG. 3 for the following reasons. First, by not requiring the adaptive equalizer 502 to perform the matched filtering function, the number of taps needed in the equalizer 502 is minimized. Second, since the matched filter 504 is fixed (i.e. not adaptive), its coefficients can also be fixed (or hard-wired) in the digital logic implementation. This eliminates the need for using actual multipliers in the matched filter since multiplication by the fixed coefficients can be implemented in a simple look-up table fashion. The implementation of this look-up table can be done cost-efficiently using a conventional ROM-based approach or using a conventional optimized PLA type of digital logic.

Figure 6:
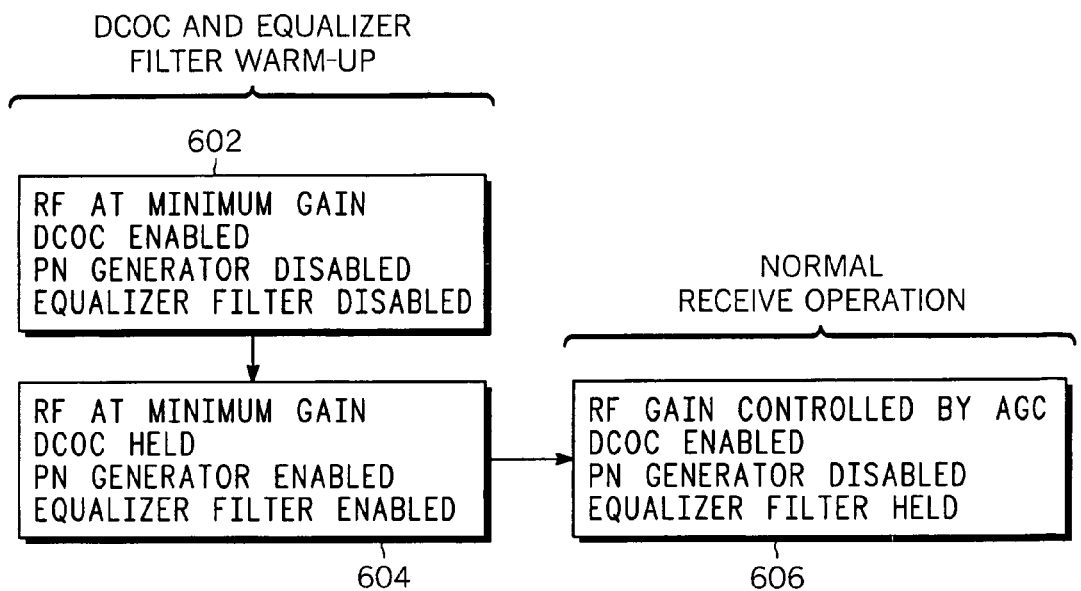
FIG. 6 is a flow diagram depicting a receiver warm-up sequence in accordance with the present invention.

Referring to FIG. 6, a flow diagram depicts a receiver warm-up sequence in accordance with the present invention.

As mentioned previously, it is desired that the adaptive equalization be performed during periodic warm-up sequences to compensate for the frequency and time domain variations in the analog baseband filter and A/D section, which as above noted may vary with or over process, temperature, and supply voltage.

The warm-up sequence in accordance with the present invention preferably begins with the RF and IF sections of the receiver set 602 to minimum gain and the DC offset correction loop (DCOC) enabled. Setting the RF and IF sections to minimum gain allows for fast acquisition of DC offsets. Removing the DC offset at the baseband filter inputs improves the operating range of the baseband filter and the A/D section while improving the detection capability of the received signal. It also improves the training capability and settling time of the adaptive equalizer. After the DC correction loop has settled, its correction values are held 604 while the RF and IF sections are maintained at minimum gain. With the DC offset removed, the PN sequence generator and the adaptive equalizer are enabled for the training duration of the adaptive equalizer. After the adaptive equalizer has settled, its coefficients remain fixed during normal data reception mode 606, since the PN generator training signal is disabled during that operational mode. The PN generator is disabled during normal data reception mode so that the detectability of the desired received signal is unaffected. In addition, during normal data reception, the RF gain is preferably controlled by an automatic gain control unit (AGC) (not shown), while the DC correction loop is placed in a low bandwidth mode. As can be seen in the indicated warm-up sequence, including an adaptive filter in the receiver incurs only the one additional intermediate step 604. It is important to note that although the poles and zeros of the analog circuitry, h(n,t), will vary over temperature and supply voltage, it is likely that they will be very slowly time varying. Thus, updating the filter coefficients once during each warm-up sequence should be sufficient to maintain an excellent SNR.

Figure 7:
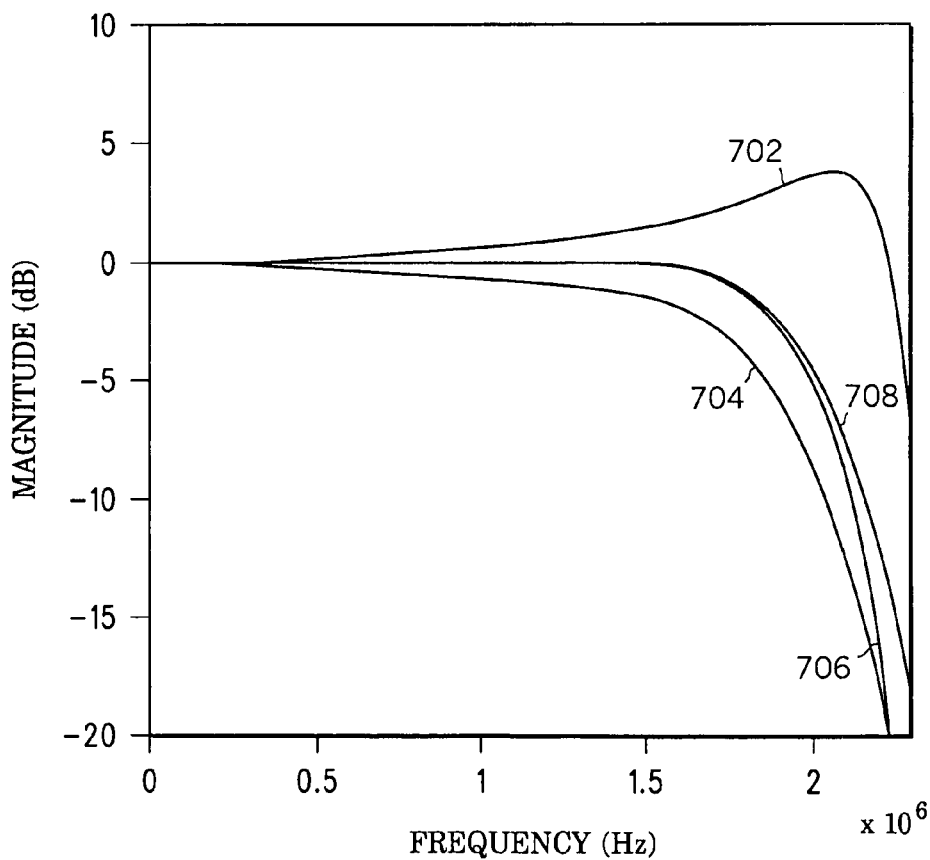
FIG. 7 is a diagram depicting magnitude response in accordance with the present invention.
Figure 8:
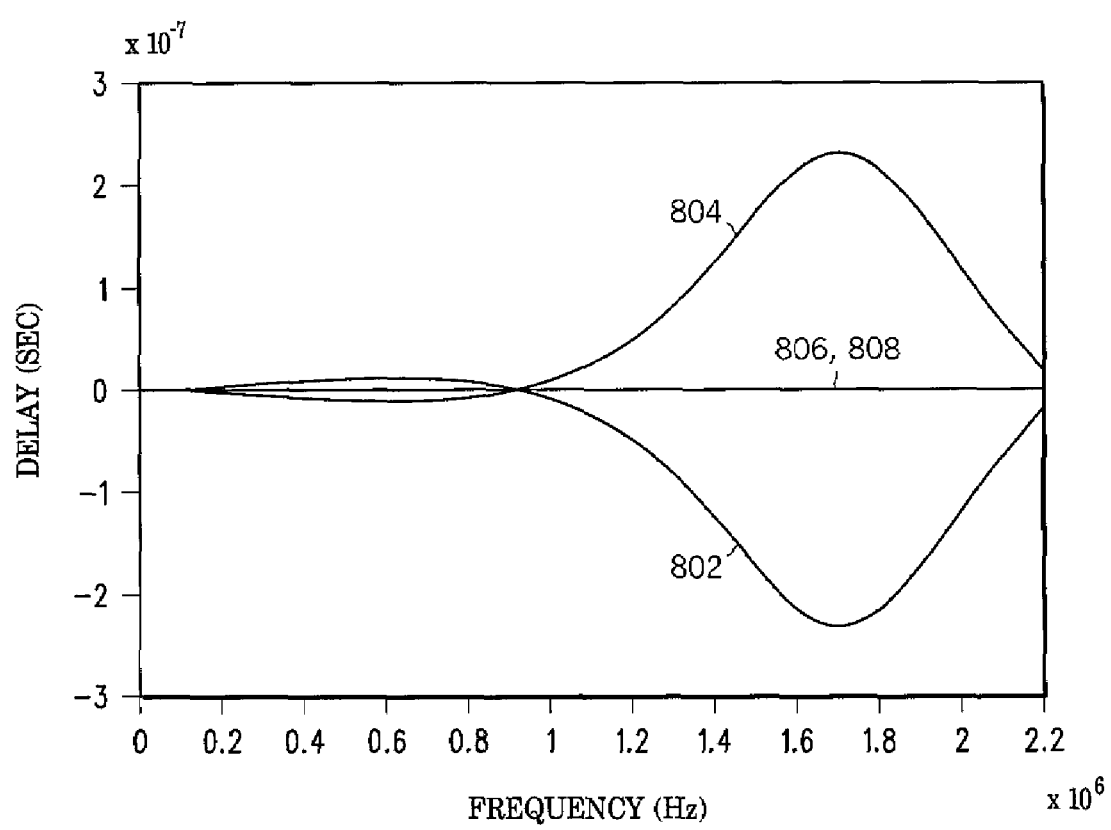
FIG. 8 is a diagram depicting group delay response in accordance with the present invention.

FIGS. 7 and 8 graphically show the performance of the adaptive equalizer in accordance with the present invention. The ideal matched filter response, a root raised cosine, is depicted in curves 708, 808. An exemplary magnitude response of the anti-aliasing filter and the A/D section is plotted in curves 704, 804. As can be seen from curve 704, the AAF, in its attempts to improve the selectivity and hence reduce the effects of the aliasing components, creates in-band droop. Also, the roll-off response (i.e. 3 dB bandwidth) of this filter varies over temperature and supply voltage. Since the AAF filter is time varying, the magnitude and group delay response curves 704, 804 are also time varying. The adaptive equalizer responses are shown in curves 702, 802, and the composite response of the anti-aliasing filter, the A/D section, and the equalizer is depicted in curves 706, 806. (Note that the curves 806, 808 lie atop one another.) The adaptive equalizer response, depicted in curves 702 and 802, will be updated by the periodic PN training sequence, thus tracking the changes in the AAF and A/D response over the operating life of the wireless communication device.

Thus, it should be clear from the preceding disclosure that the present invention provides a method and apparatus for compensating for variations in the receive portion of a wireless communication device. Advantageously, the method and apparatus provides near-optimal matched filtering and, hence, greatly improved receiver performance over the operating life of the wireless communication device. In addition, the present invention is applicable to communication protocols that do and do not support periodic training sequences.

Many modifications and variations of the present invention are possible in light of the above teachings. Thus, it is to be understood that, within the scope of the appended claims, the invention can be practiced other than as described herein above.

The invention claimed is:

1. A method for compensating for variations in a receive portion of a wireless communication device including at least one of a receiver and a transceiver, the method comprising in the device the steps of:
 generating first and second training signals that originate within the device instead of being received from a source outside the device;
 processing said first training signal through said receive portion to derive a processed training signal;
 equalizing said processed training signal in an adaptive equalizer to derive an equalized training signal;
 comparing said equalized training signal and said second training signal using an adaptive algorithm for deriving coefficients for said adaptive equalizer to compensate for the variations in said receive portion; and
 adjusting said adaptive equalizer in accordance with said coefficients to derive a compensated output signal;
 wherein the generating step comnrises the steps of:
 generating said first training sianal; and processing said first training signal through a desired target receive filter to derive said second training signal.

2. The method of claim 1, wherein the generating step comprises the step of generating a pseudo-random PN sequence within said device.

3. The method of claim 1,
 wherein the generating, processing, equalizing, comparing, and adjusting steps are performed as part of a receiver warm-up sequence, and
 wherein the method further comprises the step of holding constant the coefficients for said adaptive equalizer after said receiver warm-up sequence and during normal data reception.

4. The method of claim 1, wherein the processing step comprises the step of inserting said first training signal into an analog section of said receive portion.

5. The method of claim 4, wherein the processing step comprises the step of inserting said first training signal into a feedback path of a DC offset correction loop of said analog section.

6. The method of claim 1, wherein the adjusting step comprises the step of adjusting a response of a path through both said receive portion and said adaptive equalizer to match the response through said desired target receive filter.

7. A method for compensating for variations in a receive portion of a wireless communication device including at least one of a receiver and a transceiver, the method comprising in the device the steps of:
 generating first and second training signals that originate within the device instead of being received from a source outside the device;
 processing said first training signal through said receive portion to derive a processed training signal;
 equalizing said processed training signal in an adaptive equalizer to derive an equalized training signal;
 comparing said equalized training signal and said second training signal using an adaptive algorithm for deriving coefficients for said adaptive equalizer to compensate for the variations in said receive portion; and
 adjusting said adaptive equalizer in accordance with said coefficients to derive a compensated output signal, wherein the generating step comprises the step of generating said first and second training signals such that said first and second training signals are identical to one another.

8. The method of claim 7, wherein the adjusting step comprises the step of adjusting said adaptive equalizer to maintain a response substantially equal to an inverse of the response of said receive portion.

9. An apparatus for compensating for variations in a receive portion of a wireless communication device including at least one of a receiver and a transceiver, the apparatus comprising:
 a generator for generating first and second training signals that originate within the device instead of being received from a source outside the device;
 said receive portion coupled to said generator for processing said first training signal in derive a processed training signal;
 an adaptive equalizer coupled to said receive portion for equalizing said processed training signal to derive an equalized training signal;
 a processor coupled to said adaptive equalizer and coupled to said second training signal for comparing said equalized training signal and said second training signal using an adaptive algorithm for deriving coefficients for said adaptive equalizer to compensate for the variations in said receive portion, and for adjusting said adaptive equalizer in accordance with said coefficients to derive a compensated output signal, wherein said generator is arranged to generate said first and second training signals such that said first and second training signals are identical to one another.

10. The apparatus of claim 9, wherein said generator is arranged to generate a pseudo-random PN sequence.

11. The apparatus of claim 9, wherein said receive portion comprises an analog section coupled to said generator for inserting said first training signal into said analog section.

12. The apparatus of claim 11, wherein said analog section comprises a DC offset correction loop having a feedback path coupled to said generator for inserting said first training signal into said feedback path.

13. The apparatus of claim 9, wherein said processor is programmed to adjust said adaptive equalizer to maintain a response substantially equal to an inverse of the response of said receive portion.

14. An apparatus for cornpensating for variations in a receive portion of a wireless communication device including at least one of a receiver and a transceiver, the apparatus comprising;
 a generator for generating first and second trainging signals that originate within the device instead of being received from a source outside the device;
 said receive portion coupled to said generator for processing said first training signal to derive a processed trainging signal;
 an adaptive equalizer coupled to said receive portion for equalizing said processed training signal in derive an equalized training signal;
 a processor coupled to said adaptive equalizer and coupled to said second trainging signal for comparing said equalized training signal and said second training signal using an adaptive algorithm for deriving coefficients for said adaptive equalizer to compensate for the variations in said receive portion, and for adjusting said adaptive equalizer in accordance with said coefficients to derive a compensated output signal, wherein said generator comprises a desired target receive filter coupled to said first training signal for processing said first training signal to derive said second training signal.

15. The apparatus of claim 14, wherein said processor is programmed to adjust a response of a path through both said receive portion and said adaptive equalizer to match the response through said desired target receive filter.

16. A wireless communication device, comprising:
at least one of a receiver and a transceiver, comprising a receive portion that can have variations in response;
a generator coupled to said receive portion for generating first and second training signals that originate within the device instead of being received from a source outside the device, wherein said receive portion is arranged to process said first training signal to derive a processed training signal;
an adaptive equalizer coupled to said receive portion for equalizing said processed training signal to derive an equalized training signal;
a processor coupled to said adaptive equalizer and coupled to said second training signal for comparing said equalized training signal and said second training signal using an adaptive algorithm for deriving coefficients for said adaptive equalizer to compensate for the variations in said receive portion, and for adjusting said adaptive equalizer in accordance with said coefficients to derive a compensated output signal that is compensated for the variations in response, wherein said generator is arranged to generate said first and second training signals such that said first and second training signals are identical to one another.

17. The wireless communication device of claim 16, wherein said generator is arranged to generate a pseudo-random PN sequence.

18. The wireless communication device of claim 16, wherein said receive portion comprises an analog section coupled to said generator for inserting said first training signal into said analog section.

19. The wireless communication device of claim 18, wherein said analog section comprises a DC offset correction loop having a feedback path coupled to said generator for inserting said first training signal into said feedback path.

* * * * *

UNITED STATES PATENT AND TRADEMARK OFFICE
CERTIFICATE OF CORRECTION

PATENT NO. : 7,385,913 B2 Page 1 of 1
APPLICATION NO. : 10/131660
DATED : June 10, 2008
INVENTOR(S) : Sobchak et al.

It is certified that error appears in the above-identified patent and that said Letters Patent is hereby corrected as shown below:

Column 8 line 19 please delete "in" and insert --to--
Column 8 line 59 please delete "in" and insert --to--

Signed and Sealed this

Twenty-sixth Day of August, 2008

JON W. DUDAS
*Director of the United States Patent and Trademark Office*